Jan. 16, 1951 R. M. SOMERS 2,538,392

CLOSURE FOR PHONOGRAPHS

Filed Sept. 10, 1947

Inventor

Richard M. Somers by Henry Lanahan

Attorney

Patented Jan. 16, 1951

2,538,392

UNITED STATES PATENT OFFICE 2,538,392

CLOSURE FOR PHONOGRAPHS

Richard M. Somers, West Orange, N. J., assignor to Thomas A. Edison, Incorporated, West Orange, N. J., a corporation of New Jersey Application September 10, 1947, Serial No. 773,129

3 Claims. (Cl. 274—2)

This invention relates to improvements in closures for dictating machines, especially those adapted for using disk records, and more particularly it relates to a novel closure or cabinet for such a machine having means for securing a mounted record to its support, which cabinet is adapted to enclose wholly the mounted record during use of the machine and to expose the record, to permit its removal and to permit mounting of a new record, as an incident of releasing the mounted record from its support.

It is now common in the dictation-recording art to use disk records made of a plastic material such as of a copolymer of vinyl acetate and vinyl chloride known in the trade as "Vinylite." This is a very homogeneous material which as a record medium has substantially no surface noise. However, these plastic materials tend normally to be statically charged and when so charged they readily collect dust, lint or other loose particles that are usually floating in the air. When there is a collection of such particles on the record, the inherent noise-free condition of the record surface is destroyed and the ratio of the signal to noise level is materially reduced. Moreover, since the noise which such surface particles produce is in the high-frequency range containing the sibilant sounds that give intelligibility to one's speech, this noise reduces the accuracy with which recorded dictation can be transcribed. It is therefore important in the dictation-recording art that this record surface noise be eliminated.

The records may of course be easily preserved in a clean condition during handling and during storage as by keeping them in a suitable container, envelope or the like. But I have found that protection of the records during their storage is not enough, for if such records are left only partially exposed while they are used on the machine they will normally pick up enough loose particles from the atmosphere to impair markedly the accuracy of the recording and the accuracy with which it can be transcribed. Moreover, these particles are not easily removed since, because of the charged condition of the record, they cling tenaciously to the record and tend merely to be displaced from one portion of the record to another as the record is swept by a brush or wiped by a soft cloth.

By the present invention these difficulties are overcome by enclosing the record from the atmosphere while it is mounted on the dictating machine so that the dust particles of the air have little or no chance to lodge on the record.

An object of the invention is to provide a novel cabinet for a dictating machine which is adapted to enclose completely the record and which has a movable cover closely conforming to a portion of the mounted record and openable to expose that portion to enable the record to be readily removed from the machine by hand and a new record to be easily installed. A further object is to couple such cover with a means for releasably securing a mounted record to its support so that the cover is opened automatically as an incident of releasing the record-securing means and is closed as an incident of securing the record in its mounted position.

Other objects are to provide a novel and improved cabinet structure and mechanism for carrying out the aforestated objectives.

Still other objects and features of my invention will be apparent from the following description and the appended claims.

In the description of my invention reference is had to the accompanying drawings, of which:

Figure 1:
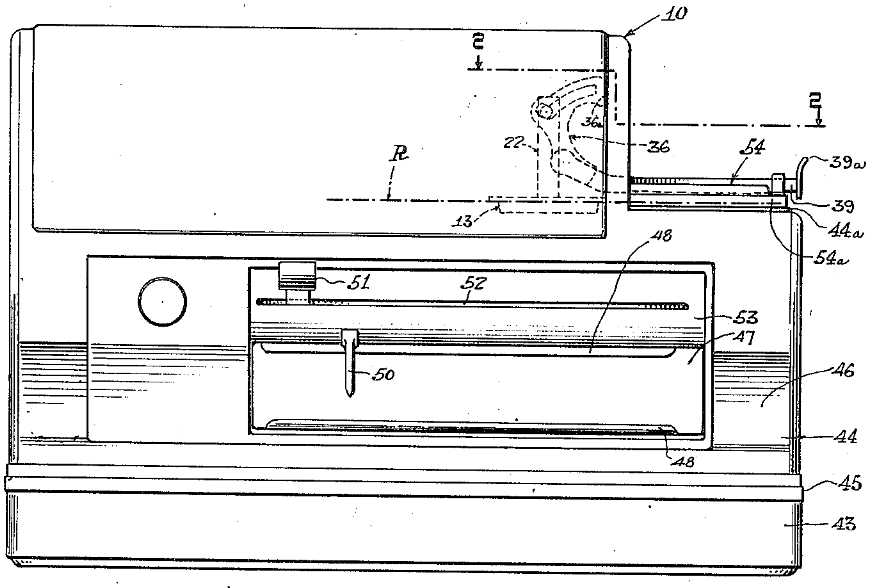
Figure 1 is a front elevational view of a dictating machine in which my invention is incorporated.

The dictating machine illustrative of my invention and shown in the accompanying drawings comprises a cabinet, generally referred to as 10, which encloses the operating mechanism of the machine. However, for the purposes of the present invention only that part of the operating mechanism which concerns the mounting of the record need be herein described in detail.

By way of preferred illustration, the present machine is adapted for recording on and reproducing from a record R of a disk form. This record is mounted on a turntable 11, fractionally shown in Figure 3. The turntable may have a downwardly offset hub portion 11a to provide it with a central well 12 that is adapted to receive a record-clamping member 13 hereinafter described. This hub portion 11a seats within a well 14 of a frame 15 (fractionally shown) and has a depending spindle 16 which journals in a bearing 17 of the frame. The top of the turntable is preferably faced by a thin layer 18 of soft material such as of felt or rubber so as to prevent the record R from being scraped or marred as it is slid across the turntable into and out of mounted position in relation thereto.

The record R has a central circular aperture 19 equal approximately to the diameter of the central well 12 of the turntable, and the clamping member 13 has a frusto-conical portion 20 which, as the member is depressed, enters the aperture 19 and the well 12 to center accurately the record on the turntable. At the top of the frusto-conical portion 20 there is a rim flange 21 which is adapted to bear against the body portion of the record surrounding its aperture 19 to clamp the record to the turntable.

The clamping member 13 is hollow and has a central aperture in its top wall receiving loosely a plunger 22. The plunger has a flanged head 23 at its lower end which is provided with a conical top surface (Figure 3) within the clamping member. The clamping member is urged downwardly against the head—and is retained thus normally in a centralized position relative to the plunger—by a compression spring 24 interposed between the head and the bottom wall of the clamping member, there being a localizing projection 25 on the head to retain the spring in place.

The plunger 22 is mounted slidably in a bearing 26 for vertical movement. This bearing is carried by a bridge 26 which at its ends is mounted on standards 28 of the frame 15, these standards being in diametrically opposite positions relative to the turntable. In the upper end of the plunger there is a slot 29 receiving a cross rod 30 which has an offset portion 30*a* (Figure 2) that is pivoted in a pair of ears 31 turned over from an upright standard 32 at the side of the bridge. On the plunger below this cross rod is a washer 33 and between this washer and the upper end of the bearing 26 is a compression spring 34 which urges the plunger upwardly and normally holds the clamping member 13 in raised position above the turntable, the raised position of the clamping member being defined by its abutment against a rubber collar 35 at the bottom of the bearing 26.

Figures 2, 3:
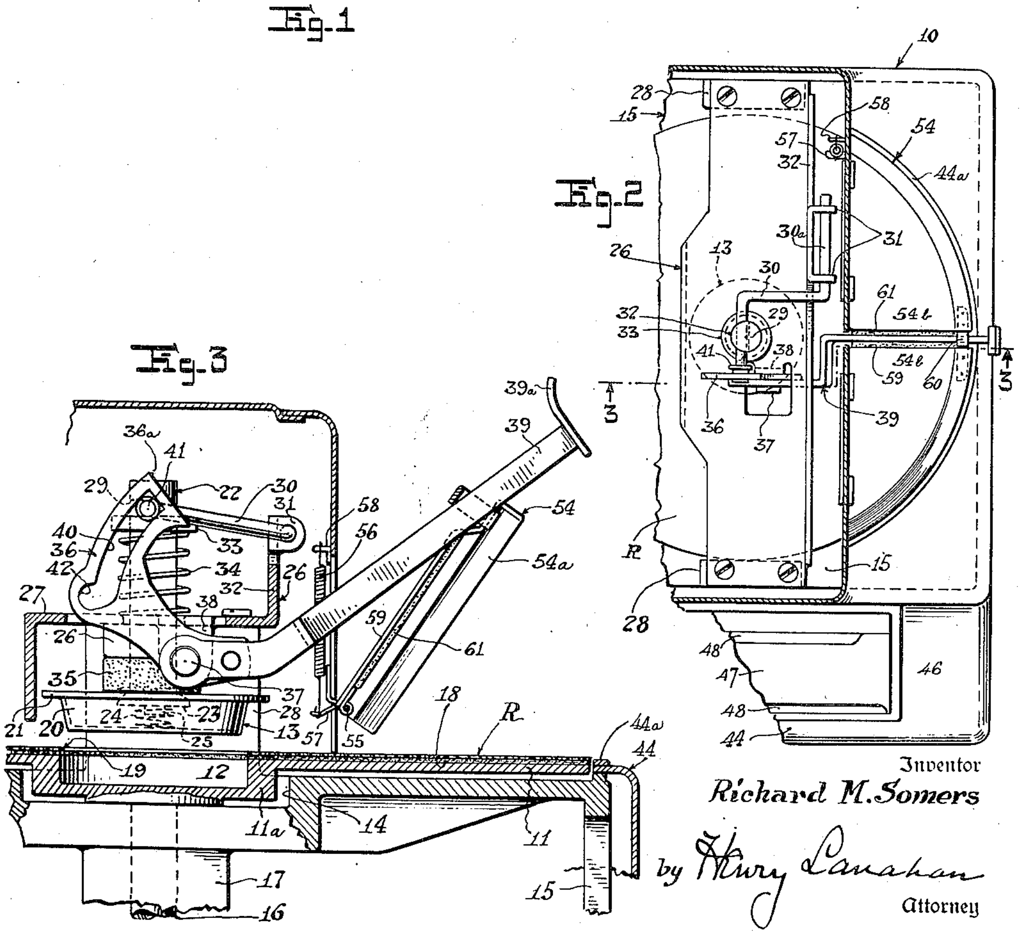
Figure 2 is a fractional section taken substantially on the line 2—2 of Figure 1.
Figure 3 is a fractional elevational view with parts in section substantially on the line 3—3 of Figure 2.

For depressing the plunger 22 and clamping a record to the turntable there is provided a cam lever 36 which is pivoted on a stud 37 carried by a depending ear 38 of the bridge 27 (Figures 2 and 3). Secured to this cam lever is a handle 39 which extends rightwardly across the turntable and terminates in a fingerpiece 39*a*. The cam lever has a cam slot 40 receiving a roller 41 that is journaled on an end portion of the rod 30. The cam slot is eccentric with respect to the pivot stud 37 so that as the handle 39 is depressed from a raised position shown in Figure 3 to a horizontal position shown in Figure 1—this horizontal position being defined by abutment of an end face 36*a* of the cam lever 36 against the standard 32—the plunger is moved downwardly to engage the clamping member with the record. At the lower end of the cam slot there is an inwardly-curved portion 42 to receive the roller 41 and serve as a detent for holding the record-clamping member in actuated position.

The cabinet 10 comprises two housing sections: a base 43 and an upper section 44. The bottom rim 45 of the upper section is offset outwardly so as to surround the upper edge of the base portion. The upper section seats on the frame 15 as indicated in Figure 3, and the two housing sections are secured fixedly together by any suitable means not herein necessary to show. The upper section has a downwardly-inclined front wall 46 at its lower portion on which is mounted a plate 47 that is provided with top and bottom turned-over edges 48 to provide a guideway for receiving slidably an index slip such as is well known in the art and not herein necessary to show. Overlying this plate 48 is a marking pointer 50 such as is also well known in the art; this pointer is moved along the slip in accordance with the relative traveling movement between the mounted record and the record-cooperable recorder and/or reproducer. Also carried with the pointer 50 is a hand lever 51 which moves through a clearance slot 52 of a pivoted closure 53 at the front of the housing; this hand lever is movable upwardly from its neutral position, shown in Figure 1, to condition the machine for reproducing and is movable downwardly from that neutral position to condition the machine for recording. The part of the upper housing section above the level of the turntable terminates just to the right of the pivot axis of the latter to leave exposed approximately half of the turntable. This is done so as to provide ready access to the turntable so that a record may be easily mounted thereon and be removed therefrom. For instance, a record mounting is effected by sliding the record between the two standards 28 and across the turntable until the inner end of the record abuts against a suitable stop (not shown) which is adapted to locate the record in an approximately centralized position—a position wherein the bottom end of the clamping member 13 lies within the area of the aperture 19 of the record—and then the handle 39 is depressed to cause the clamping member to center accurately the record and clamp the record to the turntable. To remove the record, it is only necessary to first raise the handle 39 and then slide the record rightwardly out of the cabinet.

Since the cabinet is arranged to leave a substantial portion of the mounted record exposed so as to enable easy mounting and removal of the record on and from the turntable, the record will tend to pick up dust particles from the air during use of the machine, particularly if plastic records are used, and these dust particles will reduce the accuracy with which the recorded dictation can be transcribed; moreover, these dust particles are not easily removed from the record, all as is hereinbefore explained. In order to keep the record clean during the time that it is mounted on the machine, the machine is provided with a movable protective cover 54 for the portion of the record left exposed by the cabinet proper. This cover 54 overlies the mounted record at a short distance thereabove and has a turned-down rim 54*a* which, when the cover is closed, seats on the horizontal ledge 44*a* of the cabinet surrounding the turntable. The cover is movably mounted, preferably by pivoting at 55 to the movable cabinet section 44, so that it can be raised into an open position to expose the turntable for mounting and removal of a record. The cover is biased to closed position both by its weight and by a tension spring 56 connected between an inwardly-extending ear 57 on the cover and a bracket 58 on the inner wall of the cabinet.

The cover is coupled to the record-clamping mechanism so that it is opened automatically as the record-clamping mechanism is released and is closed as the clamping mechanism is rendered effective. For instance, the cover is divided into two sections 54*b* to provide a clearance slot 59 for the handle 39, and these sections are inter-coupled by a bracket 60 secured to the sections as by spot-welding, the bracket having a loop extending upwardly between the sections which overlies the handle 39. Thus, as the handle is raised to release the clamping mechanism, the cover is lifted by the handle into an open position as shown in Figure 3, and as the handle is depressed to secure a mounted record to the turntable the cover is lowered into its closed position to provide a substantially complete closure of the record during the use of the dictating machine.

Although the cover 54 is provided with the clearance slot 59 for the handle 39 the cover may afford yet a substantially complete closure for the record since the slot 59 may be made very narrow and may be substantially closed by the handle 39 when the latter is in its downward position. Additionally, the edges of the slot may, if desired, be lined with a soft yieldable material 61 such as felt to afford a complete closure of the slot 59 when the handle 39 is in its downward position.

The embodiment of my invention herein particularly described is intended to be illustrative of my invention and not necessarily limitative thereof since this embodiment is obviously subject to changes and modifications without departure from the scope of my invention, which I endeavor to express according to the following claims.

I claim:

1. In a dictating machine including a frame and a journalled support on said frame for a disk record: the combination of a cabinet for said machine adapted to leave exposed a portion of a record mounted on said support, a cover for said record portion closely conforming thereto and pivotally secured to said cabinet for movement between open and closed positions, a clamp movably mounted on said frame for movement into and out of clamping engagement with a record on said support to secure the record in mounted relation to the latter, a handpiece projecting from said cabinet and movably mounted on said frame for back and forth movement between operative and inoperative positions, means coupling said handpiece to said clamp for moving the clamp into record-clamping position as the handpiece is moved into operative position and for releasing the clamp as the handpiece is moved into inoperative position, and means coupling said cover to said handpiece to cause the cover to be opened and closed as the handpiece is moved into said inoperative and operative positions respectively.

2. In a dictating machine operable with a disk record tending normally to collect dust particles from the air, and including a support for holding said record horizontally for rotation about a vertical axis: the combination of a device for securing the central hub portion of said record to said support, said device including a handle pivoted on a transverse axis above the central portion of said support and movable downwardly into an operated position to render the device effective and upwardly from said position to render the device ineffective, said handle extending horizontally from the central portion of the record beyond the periphery thereof and lying closely adjacent to the record when in said operated position; a cabinet for said machine arranged to expose the outer end portion of said handle and the top face of only a segmental portion of said record; a cover for said exposed record portion hinged to said cabinet on a transverse axis above said support for upward and downward movement into open and closed positions respectively; and means on said cover coacting with said handle for causing the cover to be opened and closed respectively as the handle is released from and returned to said operated position.

3. The combination set forth in claim 2, wherein said cover is biased downwardly into closed position, and said handle-coacting means comprises a member secured to said cover and merely overlying said handle for lifting the cover into open position when the handle is released and for allowing the cover to close in response to its downward bias as the handle is moved to said operated position.

RICHARD M. SOMERS.

REFERENCES CITED

The following references are of record in the file of this patent:

UNITED STATES PATENTS

| Number | Name | Date |
|---|---|---|
| 1,358,709 | Dalrymple | Nov. 16, 1920 |
| 2,166,986 | Dally | July 25, 1939 |
| 2,305,680 | Dann | Dec. 22, 1942 |
| 2,485,575 | Deaver | Oct. 25, 1949 |